United States Patent
Woronow et al.

(10) Patent No.: US 6,847,921 B2
(45) Date of Patent: Jan. 25, 2005

(54) METHOD FOR ANALYZING SPATIALLY-VARYING NOISE IN SEISMIC DATA USING MARKOV CHAINS

(75) Inventors: Alex Woronow, Pearland, TX (US); John F. Schuette, Houston, TX (US); Chrysanthe S. Munn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 79 days.

(21) Appl. No.: 10/408,597

(22) Filed: Apr. 7, 2003

(65) Prior Publication Data

US 2003/0204312 A1 Oct. 30, 2003

Related U.S. Application Data

(60) Provisional application No. 60/376,477, filed on Apr. 30, 2002.

(51) Int. Cl.[7] .............................................. H03M 1/08
(52) U.S. Cl. ...................... 702/193; 704/256; 348/607; 342/159
(58) Field of Search ........................ 702/69, 190, 191, 702/193, 66, 199; 704/256; 348/607; 342/159

(56) References Cited

U.S. PATENT DOCUMENTS 6,038,526 A * 3/2000 Stein .......................... 702/191

OTHER PUBLICATIONS

Almeida, A. S. and Journel, A. G. (1994) "Joint Simulation of Multiple Variables With a Markov–Type Coregionalization Model", J. Math. Geo., v. 25, pp. 565–588.
Gouveia, W. P., Cullick, A. S. and Deutsch, C. V (1998) "An Optimization Framework for Reservoir Characterization", 1998 SEG Expanded Abstracts.
Handcock, M. S., Meier, K., and Nychka, D. (1994) "Comment on Kriging and Splines: An Empirical Comparison of Their Predictive Performance in Some Applications by G. M. Laslett", J. Am. Stat. Assoc., vol. 89, pp. 401–403.
Journel, A. G. (1999) "Markov Models for Cross–Covariances", Math. Geo., vol. 31, pp.; 955–964.
Journel, A. G. and Shmaryan, L. E. (1999 (1994?)) "Two Markov Models and Their Application", Math. Geo., vol. 31, pp. 965–988.

* cited by examiner

Primary Examiner—John Barlow
Assistant Examiner—Victor J. Taylor
(74) Attorney, Agent, or Firm—J. Paul Plummer

(57) ABSTRACT

The invention is a method for analyzing spatially-varying noise in seismic data. Transitions between data values at adjacent data locations in a seismic data set are represented by Markov chains. Transition probability matrices are constructed from the Markov chains. Data values are predicted from the calculated transition probabilities. Noise values are determined from the predicted data values.

15 Claims, 11 Drawing Sheets

(9 of 11 Drawing Sheet(s) Filed in Color)

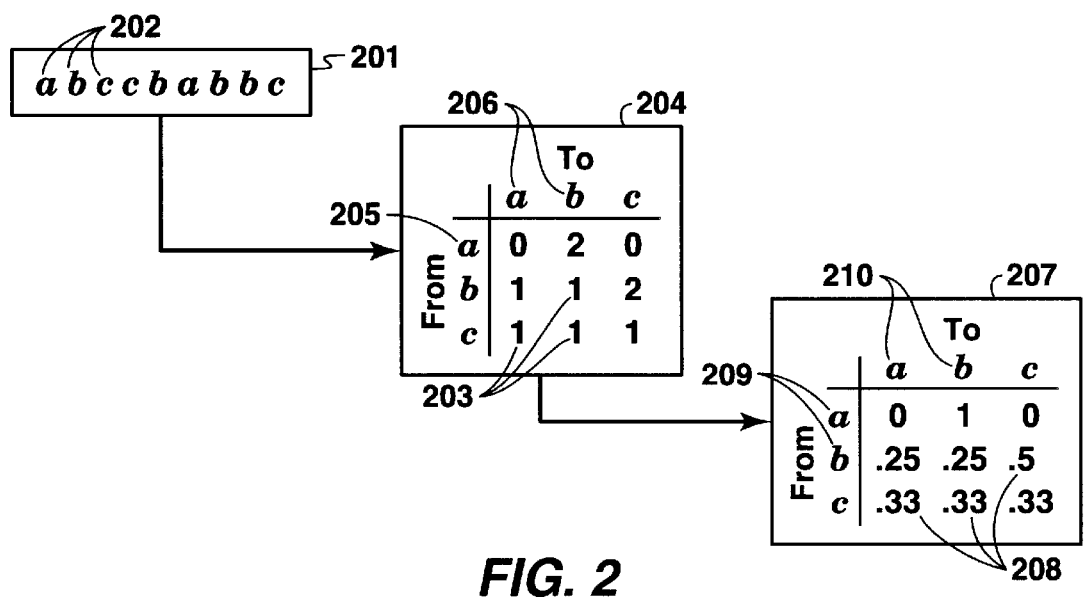
FIG. 2
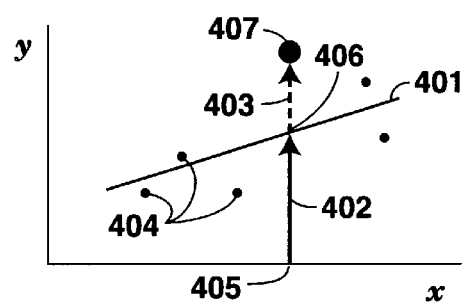
FIG. 3
FIG. 4

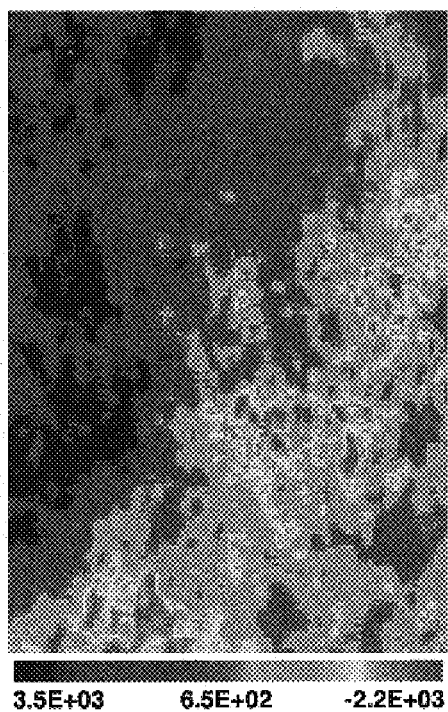
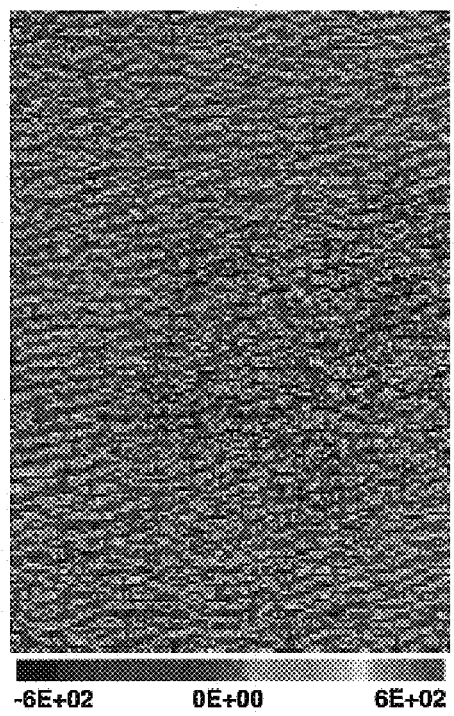
3.5E+03  6.5E+02  -2.2E+03        -6E+02   0E+00   6E+02
FIG. 11a               FIG. 11b

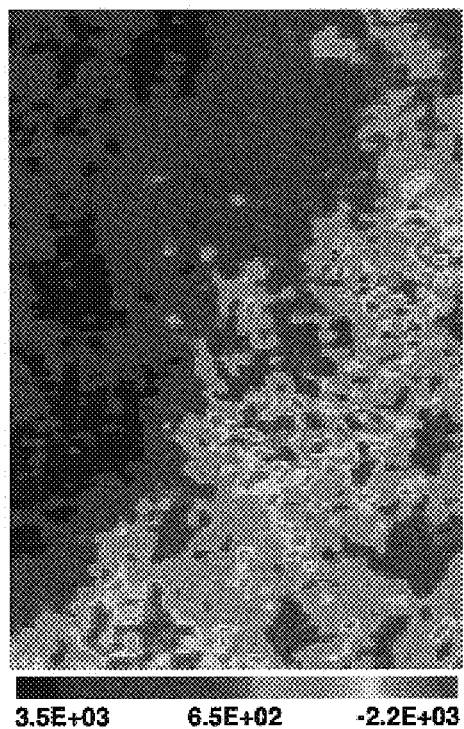 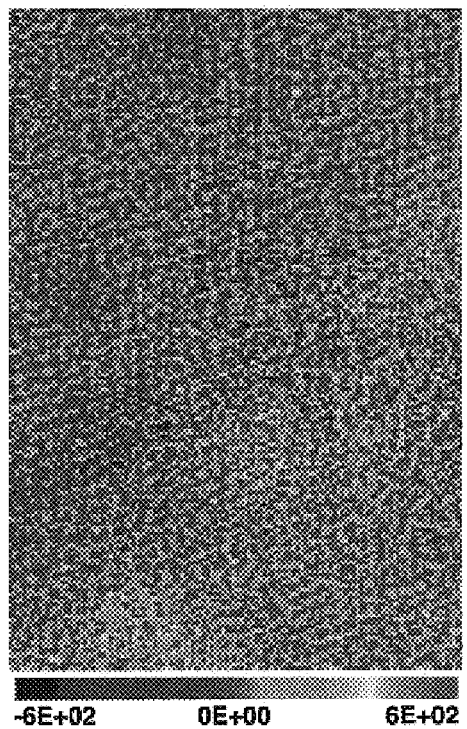
*FIG. 12a*  *FIG. 12b*

METHOD FOR ANALYZING SPATIALLY-VARYING NOISE IN SEISMIC DATA USING MARKOV CHAINS

This application claims the benefit of U.S. Provisional Application No. 60/376,477 filed on Apr. 30, 2002.

BACKGROUND OF THE INVENTION

1. Field of the Invention

This invention relates generally to the field of seismic data processing. Specifically, the invention is a method for analyzing spatially-varying noise in seismic data.

2. Description of the Related Art

Seismic data, like virtually any data, are typically noisy. The noise in seismic data affects the accuracy and reliability of products and interpretations derived from the data. Noise removal methods only provide, in general, an estimate of the true value of the underlying signal, and therefore are not completely adequate. More specifically, such estimates have uncertainties that current noise removal methods cannot adequately characterize, and those uncertainties propagate into all subsequent uses of the data. Therefore, there is a need to identify the noise in seismic data, remove it as best as possible, and quantify the uncertainty in the signal that remains.

Seismic data derived from two-dimensional or three-dimensional surveys do not have constant signal or noise levels across the entire geographical extent of the surveys. The term "seismic data" as used here includes electro-seismic data. Varying illumination, statics, wave inferences, and acquisition geometry, among other parameters, affect to varying degrees the reliability of data at different locations in the subsurface. As a result, the spatial variability of the noise inherent to a survey cannot be fully modeled before the acquisition of the data. There is a need for a method to identify and quantify the noise in the data based on analysis of information from the data themselves, and to do this in a manner that accommodates the spatial variability in data quality.

Because of the presence of noise, the properties of the subsurface deduced from survey data have uncertainties. These uncertainties limit the petroleum industry's ability to characterize the nature of hydrocarbon reservoirs, and thereby constrain decisions on reservoir economics and development strategies. Nonetheless, if alternative scenarios for the reservoir's properties can be generated that are consistent with the observed data, then those alternatives can be used to explore the corresponding reservoir economics and development strategies. Through this approach, one may identify the strategies that, given the uncertainty, will most likely achieve the desired goals. This process of generating multiple alternative scenarios, or multiple "realizations," is an important aspect of petroleum reservoir development, exploitation, and financial planning.

Several approaches have been proposed to address noise identification, noise removal, and uncertainty quantification in seismic data. These include geostatistics, trend surface analysis, signal processing and filtering, and Markov chain analysis.

Geostatistical methods involve linear interpolation to a specific geographic location given data at other geographic locations. Geostatistical methods are particularly useful in the modeling of sparse data, and have been shown to be a specific type of spline fitting. It is understood that such techniques make the assumption that the data are error free, an assumption that is inappropriate for modeling noisy seismic data. More specifically, as geostatistical realizations enumerate the spline paths that may possibly connect the data points, they do not address whether the data underlying the interpolations are reliable.

Approaches have been proposed to incorporate seismic observations into geostatistical models, for example by use of a non-statistical method that involves annealing in numerical aspects of the seismic data. Although this procedure is commonly referred to as "conditioning" the geostatistical model, conditional probabilities do not enter the simulation process and the conditioning process is neither statistical nor probabilistic. As a result, the observations and the modeled results may be substantially different.

In additional, geostatistical methods do not generally distinguish azimuthal variations (in other words, variations eastward from variations westward, northward from southward, or upward from downward). Geologic processes often have such directionality (in other words, beds thinning upward, clay content increasing offshore, and the like), and such variations may be important in determining locations, volumes, and extents of hydrocarbon reservoirs.

Markov-related modeling approaches have been proposed for geostatistical analysis. These approaches do not involve Markov chain analyses however, but merely refer to the well-known Markovian assumption that distant observations can be ignored if closer ones exist along the same direction. This assumption provides limited benefit to the problem of analyzing spatially varying noise in seismic data.

The once popular method of trend-surface analysis, a curve-fitting approach, is no longer commonly applied to geologic data and has had limited application to the field of seismic-data analysis. Trend-surface analysis is similar to geostatistics in that it involves interpolation rather than uncertainty analysis, and therefore offers limited benefit to the spatially varying noise problem.

Signal processing and filtering methods generally involve either an averaging scheme or specification of an a priori error (in other words, noise) model. Typically, the error model is based on a Gaussian distribution with fixed mean and variance. Such techniques are difficult or impossible to apply to systems where the uncertainty may not be Gaussian or where the noise varies spatially in a complex or unpredictable manner.

Two other techniques involving Markov-oriented process are referred to Markov Random Fields and Markov Chain Monte Carlo.

Markov Random Fields is a method for simulating systems that are self-organizing wherein the state of one cell is adjusted, given the states of its neighbor cells, to minimize the energy of the system. The common example of this modeling is for a magnetic material being slowly cooled through its Curie point. The resulting models are not driven by observations of a single embodiment of a physical system, but strive to provide a mathematical description of the class of physical systems. In the magnetic material cooling example, the Markov Random Field does not model any particular magnet, but rather model the behavior of the magnetic material in general. For that reason, the technique is of limited value for studying the noise characteristics of a specific seismic data set.

Markov Chain Monte Carlo is a sampling method for simulating random samples from a multivariate distribution, given the marginal distributions. The Markov chain arises in the process of simulating successive samples, and not in the description of the data itself. Most applications involve developing numerical solutions to complex Bayesian-probability problems.

More specifically, a Markov chain is a probabilistic model describing successive states of a system. Given the present state, the next state in the future does not depend upon the past states, but only upon the present state. Thus, in a Markov chain, the probability of a transition to future state $S_{i+1}$ from a previous chain of states $S_1, S_2, \ldots, S_i$, is given by $$Pr(S_{i+1}|S_1, S_2, \ldots, S_i) = Pr(S_{i+1}|S_i),$$

where Pr(A|B) represents the probability of the occurrence of state A given the existence of the state, or set of states, B.

Ordinary Markov chains describe successive states of a system. For instance, the successive states could be used to describe the time succession of the number of tasks queued for computer processing. Markov chains can also describe successive states of a system in space rather than in time. The descriptions of state successions for a Markov process are encoded in a transition probability matrix. As its name implies, the transition probability matrix contains the probability of going from any specified state to any other state in the next time or location step.

Applications to one-dimensional data dominate the published methods of using Markov chains in the analysis of spatial data for geologic systems. One common example involves the analysis of the lithologic (rock type) succession of a geologic section. However, the exact lithologies must be presumed to be known in geologic models using Markov chains, a limitation of the method.

Markov chain analysis has been shown to be mathematically similar to one form of geostatistics called "indicator Kriging," and based on that similarity Markov chain analysis has been applied to sparse well data. However, as with geostatistics, this application does not include the capability to evaluate the uncertainty in the observations, which must therefore be presumed to be error-free. The modeling results, therefore, correspond to those produced through geostatistics, and have the same limitations. Thus, neither geostatistics nor ordinary Markov chain analyses allow evaluation of alternative descriptions for noisy data.

A method for characterizing the heterogeneity of subsurface geological formations using an extension of Markov chain analysis has also been proposed. This method is based on the concept of conditioning a Markov chain on future states, and therefore allows conditioning on all available well data. However, as with the methods discussed above this method does not consider the noise inherent to the data itself, and is therefore essentially a means of interpolating sparse data.

Thus, a need exists for a method that can characterize noise in seismic data, allow one to remove that noise and evaluate the uncertainties. Possessing such capability would enhance the reliability of petroleum exploration and development decisions and allow better assessment of decision risks.

SUMMARY OF THE INVENTION

The invention is a method for analyzing spatially varying noise in seismic data. First, transitions between data values, or states, at adjacent data locations in a seismic data set are represented by Markov chains. Transition probability matrices are constructed from the Markov chains. Data values are predicted from the calculated transition probabilities. Noise values are determined from the predicted data values.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages may be more easily understood by reference to the following detailed description and the attached drawings in which:

FIG. 2 is an example of a Markov chain, illustrating the construction of its transition probability matrix;

FIG. 3 is an example of a Markov chain transition probability matrix;

FIG. 4 is an example of a fitted straight line regression model, illustrating the separation of signal from noise;

FIG. 5c is a plan view of the noise component removed from the synthetic data set depicted in FIG. 5a;

FIG. 6c is a plan view of the noise component removed from the data set depicted in FIG. 6a;

FIG. 7c is a plan view of the noise component removed from the dataset of FIG. 7a;

FIG. 11a is a plan view of the data set of FIG. 9 after noise removal by application of the method of the invention in the in-line direction only;

FIG. 11b is a plan view of the noise component removed from the data set of FIG. 9 by application of the method of the invention in the in-line direction only;

FIG. 12a is a plan view of the data from FIG. 9 after noise removal by application of the method of the invention using matrices which take into account both the in-line and cross-line directions;

FIG. 12b is a plan view of the noise component removed from the data set of FIG. 9 after application of the method of the invention using matrices which take into account both the in-line and cross-line directions;

FIG. 13a is a reproduction of FIG. 12a;

FIG. 13b is a graph of the empirical distribution of uncertainty for an arbitrary location 1301 in the data of FIG. 13a;

FIG. 13c is a graph of the empirical distribution of uncertainty for an arbitrary location 1302 in the data of FIG. 13a;

FIG. 13d is a graph of the empirical distribution of uncertainty for an arbitrary location 1303 in the data of FIG. 13a.

While the invention will be described in terms of its preferred embodiments, it will be understood that the invention is not limited to these. On the contrary, it is intended to cover all changes, alternatives, modifications and equivalents of the specifically described embodiments without departing from the scope of the invention, as defined by the appended claims.

DETAILED DESCRIPTION OF THE INVENTION

The invention is an extension of Markov chain analysis, referred to as Extended Markov Chain Characterization, or $EMC^2$, and is a method for analyzing noise in seismic data. The method is applicable to geographically distributed data. The method of the invention takes the noise level of the data into account; facilitates characterizing both signal and noise components in the data; quantifies uncertainty that results from the presence of noise; and provides a basis for producing realizations that reflect the signal and uncertainty in the observed data.

Figure 1:
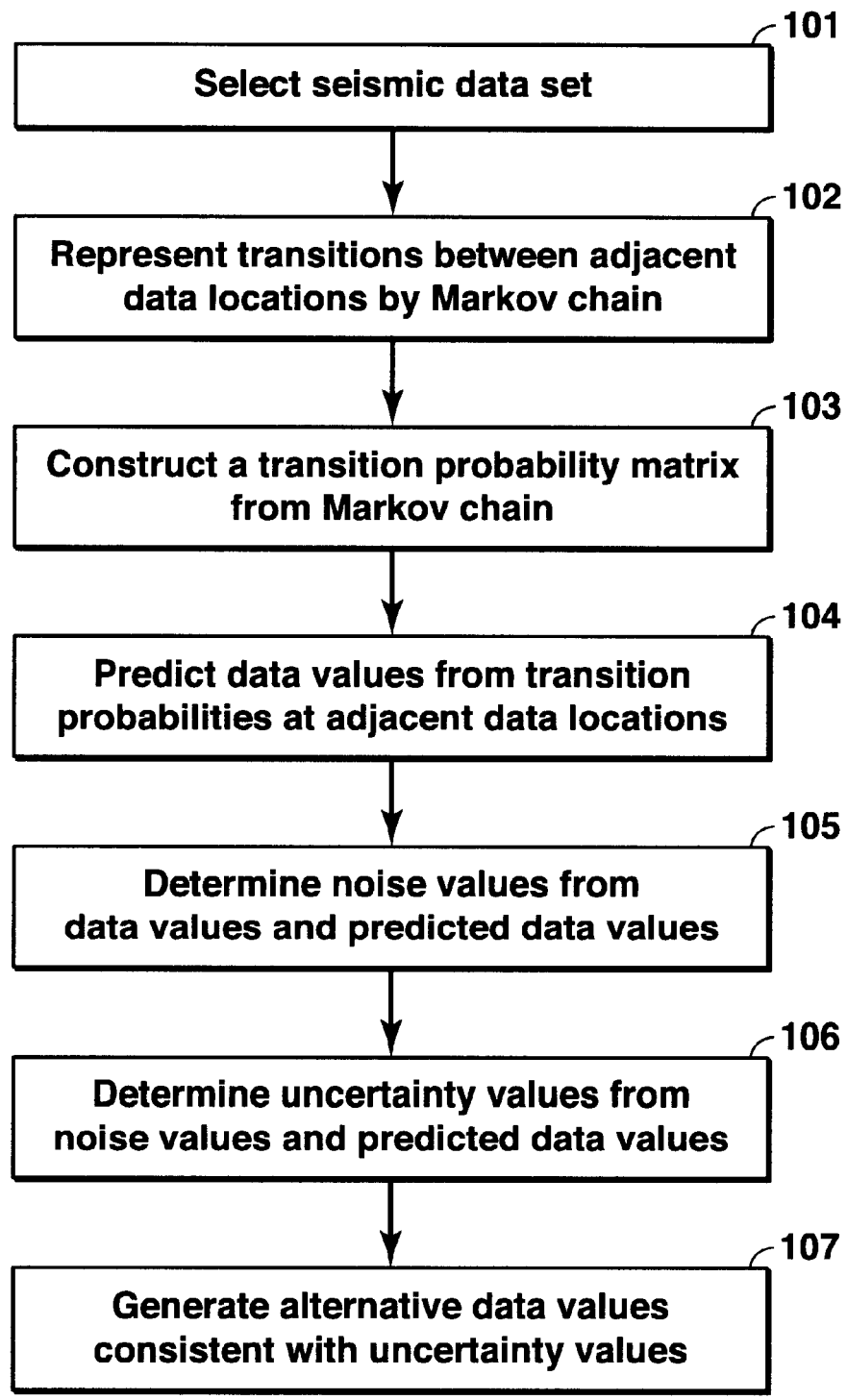
FIG. 1 is a flow chart illustrating the processing steps in an embodiment of the method of the invention.

FIG. 1 is a flow chart illustrating the processing steps in an embodiment of the method of the invention. First, in step 101, a seismic data set is selected for analysis. As will be understood to those skilled in the art, the seismic data will preferably comprise seismic data values corresponding to various receiver locations, as is typically obtained in seismic surveys. The seismic data values preferably comprise either seismic amplitude data or seismic attribute data. Examples of seismic attribute data include amplitude values along a set of seismic traces, two-way travel time to a specified reflector across a 3-D survey, and average trace amplitude in cells of a 3-D seismic cube. The method of the invention may be applied to seismic data collected from either land or marine surveys. The noise in the seismic data set may have unknown spatial and statistical properties. As will be understood to those skilled in the art, the vertical coordinate in a seismic data set may be represented as a spatial or a temporal parameter; references to either parameter in the following are not intended to be limiting.

The present invention is most effective in signal identification and noise removal for data having more that one spatial dimension, but is not restricted to multi-dimensional data. The method is preferably applied to flattened data such that the horizontal spatial dimensions (in other words the x and y directions) lie in a plane of apparent bedding.

In step 102, transitions between data values at adjacent data locations in the seismic data set selected in step 101 are represented by a Markov chain. Markov chains probabilistically describe the transitions between successive states of a system. In a first-order Markov chain, the probability of a transition to a particular state depends only upon the value of the single immediately preceding state. Higher-order Markov chains consider dependence upon more distant states. The following description and example applications of the present invention are limited to use of first-order Markov chains, but the invention is not limited to first-order applications. In the present method, the states of the system correspond to the data values in the seismic data set. The transitions between successive states correspond to the transitions between adjacent data locations. Preferably, the data are sufficiently dense such that the transition probabilities may be well defined. Small data sets, implying limited spatial sampling, may have poorly estimated transition probabilities, which may lead to an inadequate data model and reduced accuracy in the analysis result.

In step 103, a transition probability matrix is constructed from the Markov chain representation from step 102. The transition probability matrix encodes descriptions of the state successions in the Markov chain process. The transition probability matrix contains the probabilities of going from any specified state to any other succeeding state in the seismic data set. The invention is preferably applied to the seismic data in stages wherein regions of regularity are identified and analyzed separately. This approach enhances the capability to capture spatially varying noise.

FIG. 2 shows an elementary one-dimensional example of a Markov chain and a preferred method of construction of its transition probability matrix. A train 201 of state transitions represents data for the Markov chain. Each state 202 is indicated by a letter in train 201. For example, the first state 202 in train 201 is the letter a. The second state 202 in train 201 is the letter b. Transitions between states are recorded as entries 203 in a tally matrix 204 that indicates the number of times a given state is followed by another state, where the analysis proceeds from left to right in train 201. Tally matrix 204 is constructed such that an entry 203 in the $i^{th}$ row 205 and the $j^{th}$ column 206 corresponds to the number of transitions from the $i^{th}$ state to the $j^{th}$ state in train 201. For example, train 201 has no occurrences of state a being followed by succeeding state a, and therefore the entry for the first row 205 and the first column 206 is zero. Similarly, train 201 has two occurrences of state a being followed by succeeding state b, and the corresponding entry in tally matrix 204 is a two. Entries 203 in tally matrix 204 are then normalized by rows 205 to construct a transition probability matrix 207. Each entry 208 in the $i^{th}$ row 209 and the $j^{th}$ column 210 of transition probability matrix 207 is the probability of the transition from the $i^{th}$ state to the $j^{th}$ state. Accordingly, each row 209 in the transition probability matrix 207 is a probability vector.

Although the above example is one-dimensional, in other words train 201 is a single sequence of states, the concept may be extended to other applications, such as, but not limited to, two or three spatial dimensions, or to three spatial dimensions plus a time dimension. To define successive states in higher dimension data, a directionality convention must also be defined. The convention to be employed herein, and illustrated for three spatial dimensions, is that positive directions indicate the succession sequence. For example, a three-dimensional volume element state at [x,y,z] is succeeded in the x direction by the state [x+1,y,z], with similar notation for the y and z directions. Therefore, if the average trace amplitude in [x,y,z] is the current state of the system, then the average trace amplitude at [x+1,y,z] is the succeeding state in the x direction.

Two advantages derive from the present invention's use of Markov chains to develop transition probability matrices. First, many geologic processes create features with a high degree of spatial regularity. In some cases, that regularity simply may be due to the long-distance persistence of a feature of the signal or due to a slow and regular change in the signal. In other cases, it may be a series of abrupt, repeated transitions from one type of signal to another, and ultimately back to the original signal. Examples include extensive beach and delta deposits, large vertical successions of depositional cycles at various scales, and geographically extensive erosional surfaces. Seismic data commonly capture the signatures of these types of features and those seismic signatures inherit the regularity. Markov chains can model these types of regular behavior.

Second, the regular behavior produced by geologic processes may often generate a Markov chain wherein a particular state at a location x will have a limited number of states to transition to at location x+1. If the transition from state x to x+1 is a low probability event, and the transition from state x+1 to state x+2 is also a low probability event, then state x+1 may be suspected as being in error, for example as having a high degree of noise. In other words, state x+1 is behaving in a manner not consistent with the dominant regular behavior of the geology as captured by the seismic data and the Markov chain, and the subsequent analyses and alternative realizations may take that inconsistency into account.

FIG. 3 shows an example transition probability matrix 301 for a Markov chain. Transition probability matrix 301 is indicative of a very systematic or regular system. For instance, each state 302, once achieved, has a tendency to persist in that same state. This tendency is indicated by the largest probability values being on the diagonal 303 of the transition probability matrix 301. Furthermore, when a transition occurs out of a state 302, there is a favored alternative end state 304. For example, as between state B and state C, the transition from state A is more likely to be to state B 305 than state C 306, as indicated by the larger probability value 0.19 as compared to the transition probability from A to C of 0.01.

In an alternative embodiment, the transition probabilities can be estimated directly from the seismic data set selected in step 101. In a further alternative embodiment, the transition probabilities can be estimated from any available geologic data such as, but not limited to, outcrops, well logs, bore holes, seismic surveys, processed derivatives of any of the above data, or information derived from data taken in geologically similar areas.

In step 104, predicted data values for data locations in the seismic data are determined from the transition probabilities for transitions from adjacent data locations. The transition probabilities for transitions from the adjacent locations are used to calculate the uncertainty of the observed value at the location and to calculate its expected value by the Markov chain. A preferred method of calculating this uncertainty will be explained in detail below in the context of FIG. 4 and Equations (1) and (2).

In step 105, noise values are determined for data locations in the seismic data from the corresponding predicted data values determined in step 104 and the data values at the data locations. The noise values are preferably determined by subtracting the predicted data values determined in step 104 from the data values at each data location.

In an alternative embodiment, step 106, uncertainty in the seismic data may be optionally determined from the transition probabilities for transitions from adjacent locations. This calculation is described in detail in the context of Equation (2), below.

In a further alternative embodiment, step 107, random realizations may be optionally generated. Such random realizations could for example involve a plurality of alternative data values that are consistent with the uncertainty in the seismic data determined in step 106. This alternative is further described below in the context of Equations (3) and (4).

Mathematical Foundation:

The method of the invention addresses the processing and interpretation of seismic, including electro-seismic, data, particularly in regards to evaluating data quality, remediating low-quality data, quantifying uncertainties in data and its products, and facilitating improved understanding of models that are derived from data. Regression analysis is one well-known approach for modeling uncertainty in a dataset, and will be used to demonstrate the approach taken by the method of the present invention. The use of a regression analysis example, as well as the description and derivation of the equations included in the following, are for demonstration purposes only and are not limitations of the present invention.

FIG. 4 shows a regression model 401 that has been derived from a set of data 404. Data 404 comprise a family of observations, each of which individually comprise noise and signal components. Model 401 is a straight line that is assumed to represent the signal 402 present in the data 404 at any given point along model 401. As is understood in the art, the model's slope and intercept are determined by contributions of information from each of the observations in data 404. At any given value of x 405, the best estimate of the corresponding y is given by the value 406 of the model 401 at that x 405. The uncertainty in estimate 406 depends on the amount of scatter inherent to data 404 with respect to model 401.

For any given x 405 at which an observed data point 407 is available, the difference between the model 401 y value 406 and the observed value 407 is assumed to be the noise 403 in that observation 407. Model 401 captures the signal 402 and the residual difference captures the noise 403. The method of the present invention employs an analogous process for separating signal from noise that applies to noisy, geologic, spatial data.

With reference again to the transition probability matrix 301 in FIG. 3, the variable $\tau_{ij}$ will be used in the following to indicate the transition probability of going from starting state i (302 in FIG. 3) to ending state j (304 in FIG. 3). Assume for example that the state transitions from locations x through x+1 to x+2 are represented by the states A→C→A. It is well known in the art that the probability of this two state transition can be given by $$Pr(A \to C \to A) = \frac{\tau_{A,C}\tau_{C,A}}{\sum_{i=A,B,C} \tau_{A,i}\tau_{i,A}}. \quad (1)$$

For transition probability matrix 301 in FIG. 3, the calculations in Equation (1) gives a transition probability Pr(A→C→A) of approximately 0.0043. Under the assumption that the data are measured on a system exhibiting a high degree of spatial regularity, this low value provides reason to suspect that the observed state, C, at the location x+1 is dominated by noise. In other words, the low probability associated with state C as the transition between two states A suggests that the measurement value for that state is noisy, and that the value does not accurately portray the signal component for the state. The method of the present invention provides a mechanism for quantifying that low probability and for establishing an improved estimate of the signal for that state.

The method of the present invention therefore addresses the question: "If state C at x+1 is a noisy value, what is the noise level and what is the signal most likely to be?" This question is addressed by rewriting Equation (1) as $$Pr(A \to S \to A) = \frac{\tau_{A,S}\tau_{S,A}}{\sum_{i=A,B,C} \tau_{A,i}\tau_{i,A}}, \quad (2)$$

where the variable S is an unknown that may represent any of the individual state values A, B, and C. Equation (2) yields the following probabilities for the three possible state values of variable S:

$Pr(S=A)=0.993$, $Pr(S=B)=0.0029$, $Pr(S=C)=0.0043$.

Equations (1) and (2) involve a process of probabilistically analyzing the contents of a central location from an adjacent location and is referred to in the following as "neighbor voting". The process of neighbor voting allows the method of the present invention to construct a data model, an analog to the straight line regression model 401 in FIG. 4, and to thereby determine estimates of signal 402 from noise 403 at any location.

Specifically, if states A, B, and C are numerically valued, the probabilities calculated from Equation (2) can be used to obtain an expected numerical value for S. For example, assume that the states were binned (or discretized) into values of a seismic attribute covering the following ranges:

$0 < A \leq 1$, $1 < B \leq 3$, and $3 < C \leq 7$ units.

For this example, further assume that the observed value of a state corresponds in all cases to the center points of the intervals. For example, an observed value of C in the sequence of states A→C→A would be five. Using Equation (2) and the center points of the intervals, the expected value of S is 0.5238 units, which results from the sum of the product of the center value of each interval with the probability associated with that interval, in other words (0.993)*0.5+(0.0029)*2+(0.0043)*5=0.5238. This quantity is the expected value of the signal; the noise, defined as the observed value minus the predicted value, is therefore calculated to be 4.4762.

On the other hand, if the states are qualitative, a state x+1 can be characterized by the mode in the probability distribution, where the mode is defined as the most commonly occurring or most probable state. In this case, state A is the most probable value for S, because that state has the highest probability of occurrence. The signal in this example is assumed to be the center point of state A, or 0.5 units, and the noise is then calculated to be 4.5 units.

Analysis by the method of the invention does not depend upon the direction selected as +x. In other words, the calculations in Equations (1) and (2) are symmetric with respect to spatial direction. The calculations also make no assumptions about the noise, either about its magnitude or its distribution function. Therefore, the method of the invention enables the estimation of the signal and the quantification of the uncertainty in that signal without such assumptions.

The above discussion has focused on one-dimensional data. The method of the invention readily extends to two or three spatial dimensions and to three spatial dimensions plus a time dimension, under the assumption that the values surrounding S are at least conditionally independent, given the value at S. For three dimensions, the analog of Equation (2) is $$Pr(S \mid \text{neighbors}) \propto \frac{\tau_{aS}\tau_{Sb}\beta_{aS}\beta_{Sb}\gamma_{aS}\gamma_{Sb}}{f^2(S)}. \quad (3)$$

Here the three chains are designated as $\tau$, $\beta$, and $\gamma$, for the +x, +y, and +z directions, respectively, with the neighbors' states designated as a and b. The latter can represent different states for each of the three directions. Thus, $\tau$, $\beta$, and $\gamma$ all indicate transition probabilities, as defined above for $\tau_{ij}$. The factor $f^2(S)$ can be estimated by the frequency of occurrence of state S in the seismic data set or can be interpreted as a prior probability. Approaches for estimation of this factor will be understood to those skilled in the art.

Similarly, if a particular subsurface region is repeatedly surveyed over time by seismic methods, then the time coordinate may function as another axis along which a Markov chain could be constructed and applied to estimate the state in a given volume element at a given time.

The method of the invention also enables the generation of alternative data value realizations that are consistent with the observed data values up to the level of the observed noise. In three dimensions, the equation needed to generate a realized data value at a data location, given the realized data values of adjacent data locations in the −x, −y, and −z directions, is $$Pr[S \mid uvw) \propto \frac{\tau_{us}\beta_{vs}\gamma_{ws}}{\pi^2(S)}. \quad (4)$$

Here u, v, and w are the previously realized data values in the −x, −y, and −z directions, respectively and S indicates the value to be realized. The term $\pi(S)$ is a prior probability. As with the factor $f^2(S)$ in Equation (3), persons skilled in the art of Bayesian statistical analysis will understand the considerations to be used in estimating this prior probability. Similar equations apply when either fewer or additional values have been realized in the vicinity of S. Persons skilled in the art will also understand the extension of the above analysis to such applications.

If this prior probability distribution $\pi(S)$ is taken to be uniform, then the data value realizations given by Equation (4) will be essentially of the type that was described in the discussion of the example Markov chain 201 in FIG. 2. The data value realizations will have a statistically identical underlying Markov chain transition probability matrix 207, and therefore frequency of occurrences for the states, but will not directly correspond to the specific seismic attribute observations from which the transition probability matrix 207 was built. For example, the transition probability matrix 207 from FIG. 2 can be used to generate the succession (random data value realization) "b c c a b a b c b." Outwardly, this chain does not resemble the original Markov chain 201 shown in FIG. 2, and therefore has little utility for analyzing the underlying seismic data set. However, if prior probabilities are calculated according to Equation (3), then the realization will also relate to the observed specific seismic data in the sense that any such realization provides an alternative interpretation of the observed data. This alternative interpretation allows for the fact that noise has introduced uncertainty into the ability to interpret the underlying data. The ability to develop realizations that are consistent with the underlying seismic dataset enables an analyst to consider alternative geologic and geophysical models for the region from which the seismic data were obtained, and thus provides an ability to consider alternative hydrocarbon development scenarios for any such region. This important capability provided by the method of the invention facilitates, for example, the modeling of alternative economic outcomes for developments under consideration.

The method of the invention has many potential applications. For example, the method enables the recognition and removal of some types of acquisition artifacts in seismic data—seismic attribute data in particular. Similarly, the method facilitates the recognition and removal of random noise in seismic data. This application aids the probabilistic autopicking of horizons and the estimation of reservoir connected volumes. It also aids the estimation of joint probabilities for spatially distributed parameters, such as, but not limited to, porosity, permeability, and water saturation.

The method also can be used in the selection of calibration attributes, thereby improving the resolution in time lapsed monitoring analyses that use seismic attributes. This application will also aid in the estimation of permeability using grain-to-grain modeling in thin section data, which improves the prediction of uncertainty in reservoir properties from seismic attribute calculations. The method can also be used on near-offset data to improve the signal-to-noise ratio in far offset seismic data, thereby improving Amplitude Versus Offset analysis.

The method is illustrated in the following four examples, three of which derive from synthetic data sets and one of which derives from a seismic survey. All four data sets are two-dimensional.

Figure 5A:
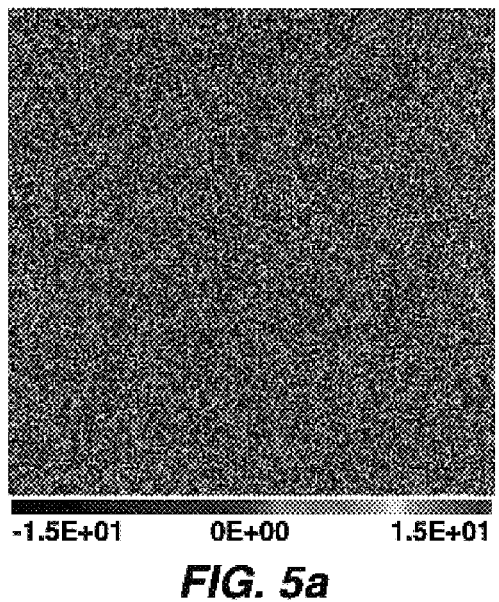
FIG. 5a is a plan view of an example synthetic data set consisting of stationary Gaussian random noise.
Figure 5B:
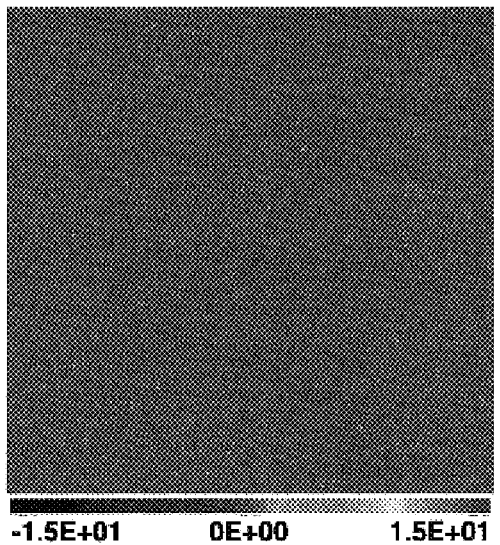
FIG. 5b is a plan view of the data from FIG. 5a after noise removal by application of the method of the invention.
Figure 5C:
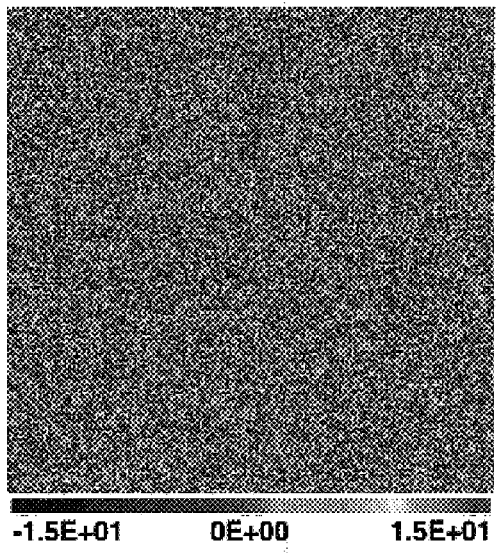

The first example, FIGS. 5a–5c, illustrates the application of the method to a relatively simple type of noise. In this example, the synthetic data set consists of a 200×200 grid populated with stationary Gaussian random noise having a mean of zero and a standard deviation of five units. For the purposes of this example, the units of the synthetic data do not need to be more specifically defined. The data values were binned into one-unit classes. FIG. 5a shows a plan view of the grid before application of the present method. The irregular, speckled characteristic of the figure is indicative of the variation in the data resulting from the presence of noise. Middle blue represents the average value for the data (zero) with colors toward the red end of the color bar indicating positive values and those toward the other end indicating negative values. Markov chains were constructed for the +x (horizontal) and +y (vertical) directions and neighbor voting calculations were performed to remove noise from the data set. FIG. 5b shows the result. Note the substantial elimination of the irregular, speckled characteristic. The mode of this data, which may be considered to be the best estimate of the signal, is zero. FIG. 5c shows a view of the noise component that was removed from the synthetic data set depicted in FIG. 5a. The similarity of this figure with FIG. 5a provides evidence of the ability of the present method to remove noise a data set.

Figure 6A:
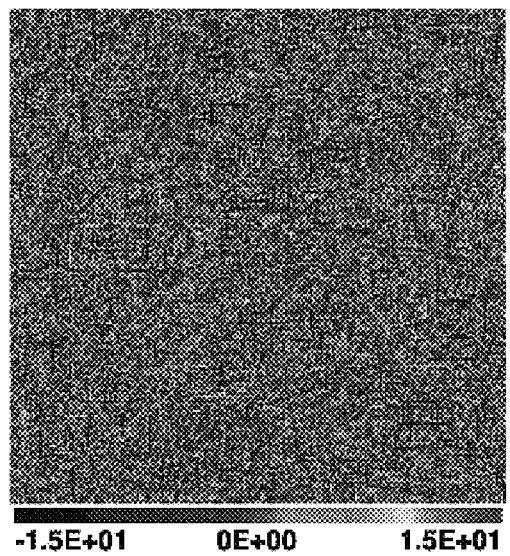
FIG. 6a is a plan view of an example synthetic data set having Gaussian random noise and correlated noise in the horizontal, vertical, and diagonal directions.
Figure 6B:
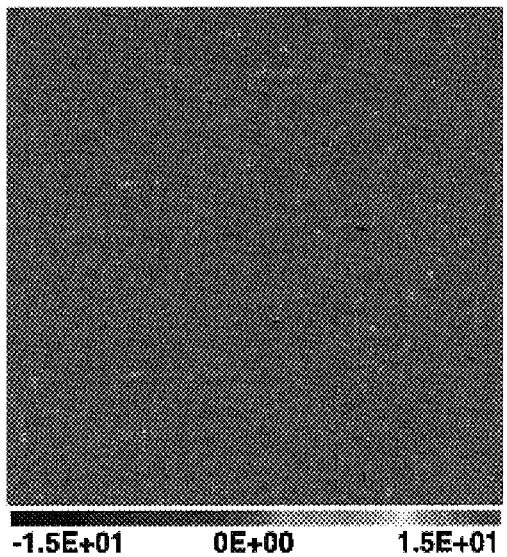
FIG. 6b is a plan view of the data from FIG. 6a after noise removal by application of the method of the invention.
Figure 6C:
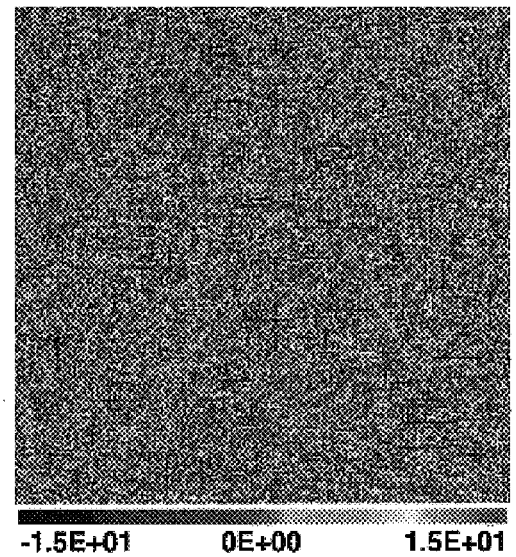

The second example, FIGS. 6a–6c, illustrates the application of the method to a data set having both random noise and patterned noise components. As in FIGS. 5a–5c, data values are indicated by color. It is understood in the art that patterned or correlated noise is a difficult type of noise to identify and treat, and, in general, successful treatment of such noise requires a priori knowledge about the noise signature so as to allow the designing of special filters to isolate that particular signature. An advantage of the present method is that no such prior knowledge of the noise signature is required.

The synthetic data set depicted in FIG. 6a has the same noise characteristics as depicted in FIG. 5a, but with the addition of patterns or correlations in the noise in the horizontal, vertical and diagonal directions. The patterns are exemplified visually by various horizontal and vertical lines of constant color embedded within the irregular speckled noise. FIG. 6b shows a plan view of the data from FIG. 6a after application of the method of the present invention, and FIG. 6c shows a plan view of the corresponding residuals or noise removed from FIG. 6a. Note once again the substantial removal of the noise characteristics of the underlying data set, and the similarity of the residuals in FIG. 6c to the data depicted in FIG. 6a.

Figure 7A:
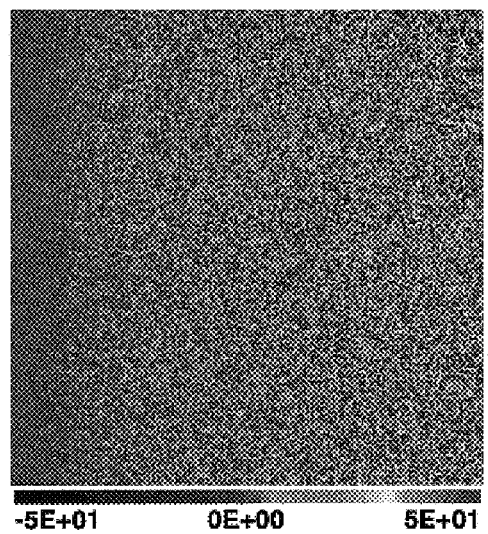
FIG. 7a is a plan view of an example synthetic data set having nonstationary Gaussian random noise whose standard deviation increases from left-to-right across the figure.
Figure 7B:
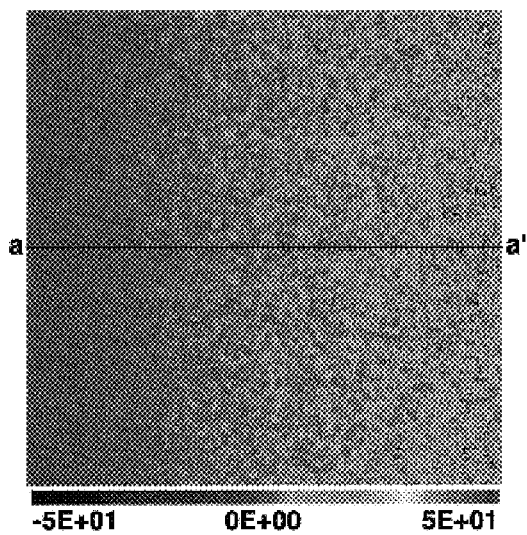
FIG. 7b is a plan view of the data from FIG. 7a after noise removal by application of the method of the invention.
Figure 7C:
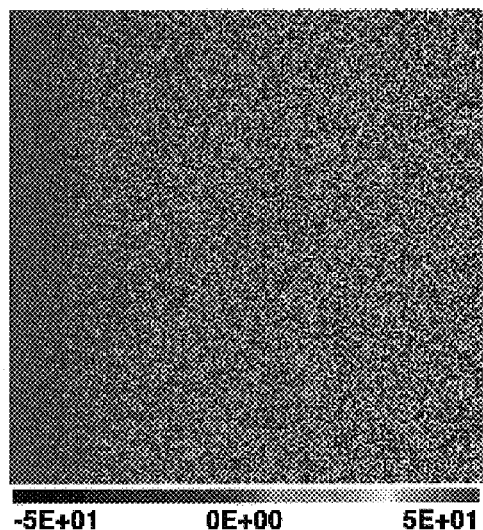

The third example, FIGS. 7a–7c, illustrates removal of nonstationary Gaussian noise, specifically Gaussian noise having a spatially varying standard deviation. Data sets having such noise characteristics are particularly difficult to treat without an a priori noise model. FIG. 7a shows a synthetic data set having Gaussian random noise whose standard deviation varies from a value of zero at the left of the figure, to a value of 20 units at the right. The dynamic range of the colors indicates this spatial change in noise intensity. At the left of the figure, colors are close to the middle blue of the color bar whereas at the right of the figure more extreme colors occur more commonly. FIG. 7b shows a plan view of the data set after noise removal, and FIG. 7c shows a plan view of the corresponding residuals or removed noise. Without any a priori assumptions about the noise characteristics, a substantial amount of the noise has been removed from the synthetic data set, as evidenced by the residuals in FIG. 7c.

Figure 8:
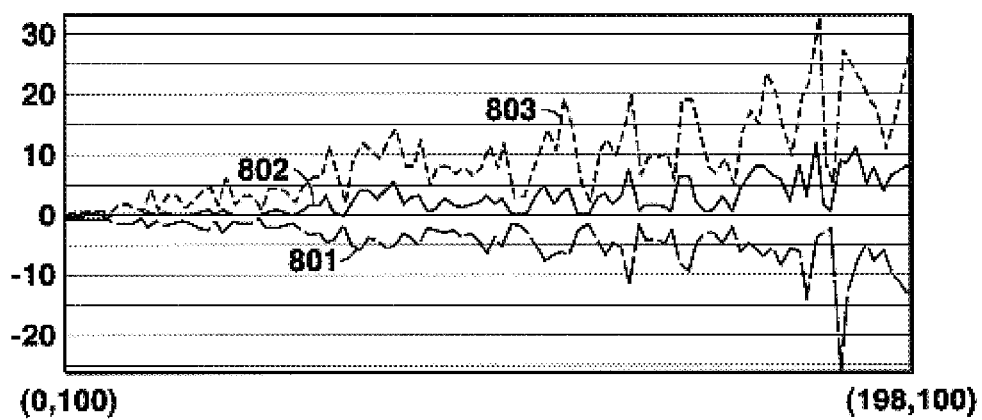
FIG. 8 is a graph of the uncertainty in the estimated values of the recovered data along the horizontal line a–a' in FIG. 7b.

The noise removal results of FIGS. 7a–7c are quantified in FIG. 8, which shows a graph of the uncertainty in the estimated values of the recovered signal (in other words the signal depicted in FIG. 7b) along the horizontal line indicated as a–a' in FIG. 7b. The uncertainty is indicated by 10 and 90 percentile estimates and the signal is a 50 percentile estimate, as indicated by reference numbers 801, 803, and 802 in FIG. 8, respectively. The uncertainty interval between the 10 and 90 percentile estimates widens as the noise in the data increases from left to right. The estimated noise level at the left is consistent with a zero variance. Fluctuations of the 50 percentile line about the zero value, particularly at the right of the figure, result from noise that was not completely removed. The present method not only provides an ability to remove noise from a dataset, but also provides an ability to quantify the amount of uncertainty in the dataset that results.

Figure 9:
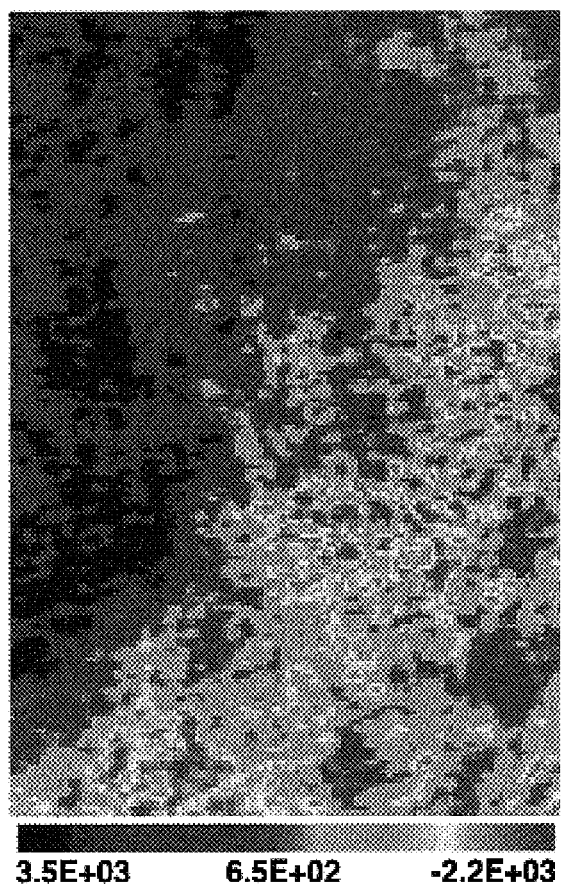
FIG. 9 is a plan view of an example seismic data set.

The fourth example, depicted in FIGS. 9–13, illustrates removal of noise from an actual seismic data set. The data set consists of a seismic attribute extracted at a horizon bounding a reservoir interval. FIG. 9 shows a plan view of the data as a 122×178 grid cell array. A visual study of this figure suggest noise is present which may be due to the pattern of seismic acquisition (nongeologic looking variations in the data, such as streaking) as well as random noise (individual cell values that differ noticeably from the average values in surrounding cells). For reference, the in-line direction (in other words, the direction along a connected set of geophone arrays) is approximately horizontal in the figure and the cross-line direction is approximately vertical in the figure. Reds and yellows in this figure are thought to indicate areas of high porosity and therefore potential hydrocarbon reservoir. Colors to the left of these on the color bar are thought to indicate successively less porous rock.

Figure 10A:
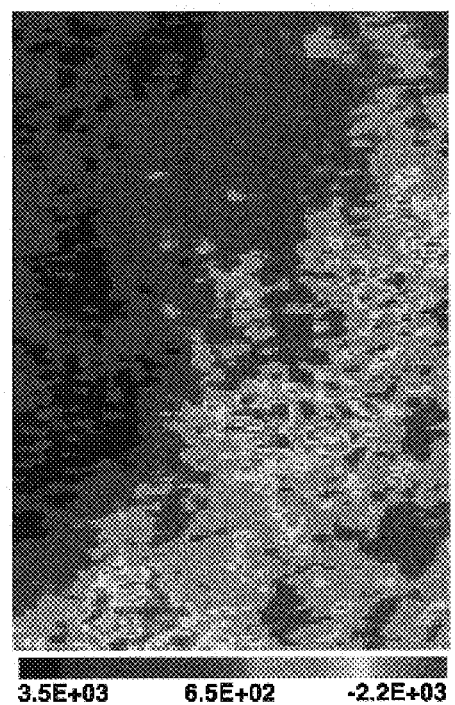
FIG. 10a is a plan view of the data set of FIG. 9 after noise removal by application of the method of the invention in the cross-line direction only.
Figure 10B:
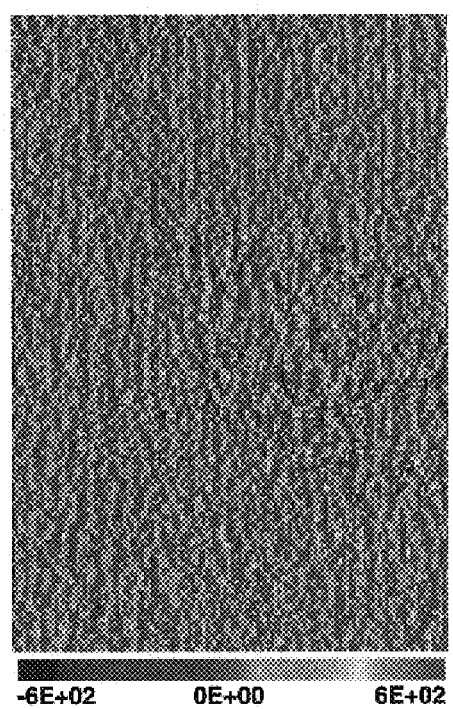
FIG. 10b is a plan view of the noise component removed from the data set of FIG. 9 by application of the method of the invention in the cross-line direction only.

To demonstrate the method of the present invention using this data set, the method was applied and is displayed separately, first for the cross-line direction, FIGS. 10a–10b, and second for the in-line direction, 11a–11b.

FIG. 10a shows a plan view of the mode of the data from FIG. 9 after noise removal by application of the method of the invention in the cross-line direction only, in other words the matrices in this example were only developed in the vertical direction. The horizontal streaking that remains in FIG. 10a indicates the remaining correlated noise in the in-line direction. FIG. 10b shows a plan view of the corresponding residuals or removed noise, and the substantially vertical streaking in this figure indicates that the cross-line noise has been removed from the underlying data set. It will be noticed that the cross-line noise is not stationary. Some regions of FIG. 10b show a low range of colors. Many types of data exhibit the relationship in which a higher signal value carries with it a higher noise value. That appears to be true of these seismic data. FIGS. 11a and 11b depict the converse result. Specifically, FIG. 11a shows a plan view of the mode of the data from FIG. 9 after noise removal by application of the method of the invention in the in-line direction only. Vertical streaking in FIG. 11a indicates the remaining correlated noise in the cross-line direction. FIG. 11b shows a plan view of the corresponding residuals or removed noise, and the substantially horizontal streaking in this figure indicates that the in-line noise has been removed from the underlying data set. It can be seen that the in-line noise is not stationary, as indicated by the spatial variation in the dynamic range of the colors.

FIG. 12a depicts a plan view of the mode of the data from FIG. 9 after application of the method of the invention using matrices which take into account both the in-line and cross-line directions. This application used a two-dimensional equivalent of Equation (3). Patterned noise in both directions is removed, as is random noise, leaving a clearer, smoother, more geologic-appearing image of the signal. FIG. 12b shows a plan view of the corresponding residuals or removed noise; streaking in both the vertical and the horizontal directions can be observed, thus supporting the conclusion that the two-dimensional technique successfully removed noise patterns occurring in each of these directions. In addition, FIG. 12b shows some speckling, indicating that random noise has also been removed.

Figure 13A:
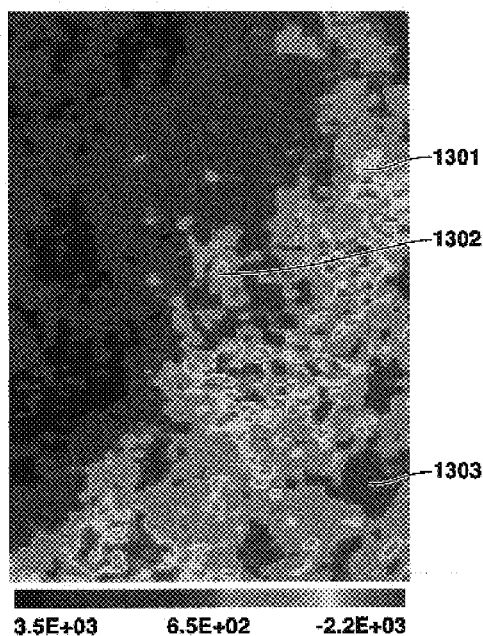
Figure 13B:
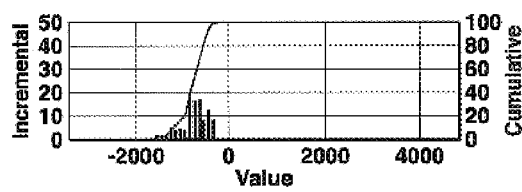
Figure 13C:
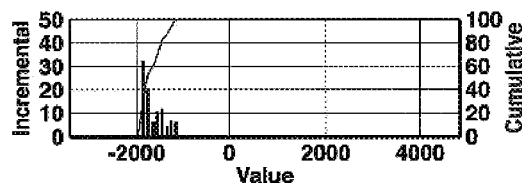
Figure 13D:
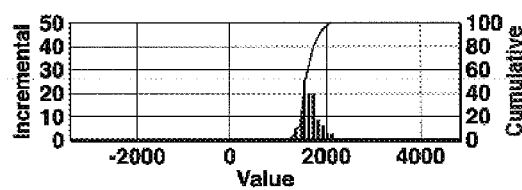
Figure 14A:
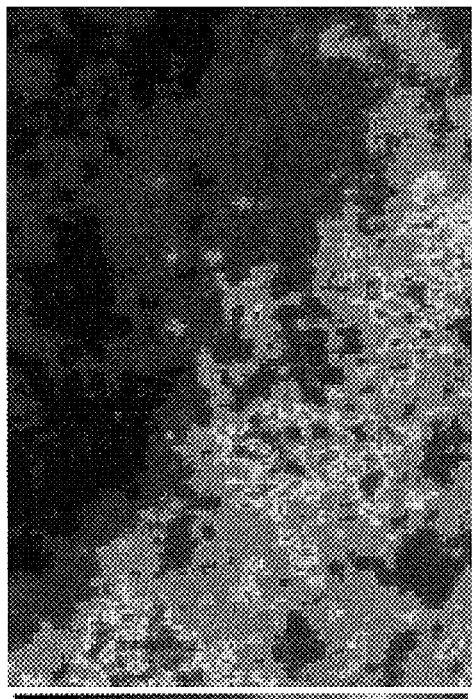
FIGS. 14a, 14b, 14c and 14d are plan views of four random realizations of the data from FIG. 9 generated by the method of the invention.
Figure 14B:
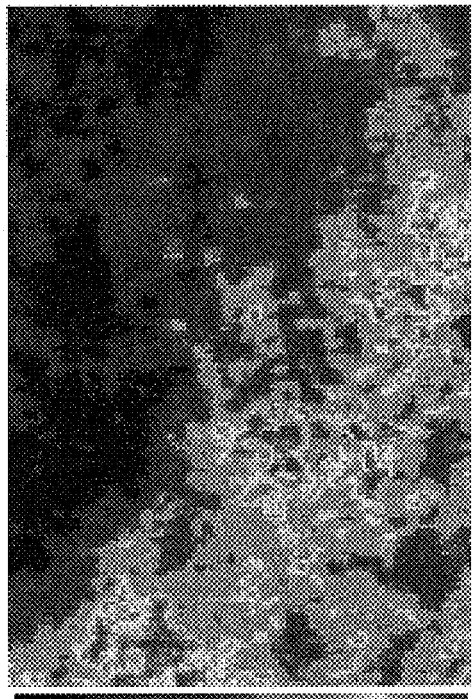
Figure 14C:
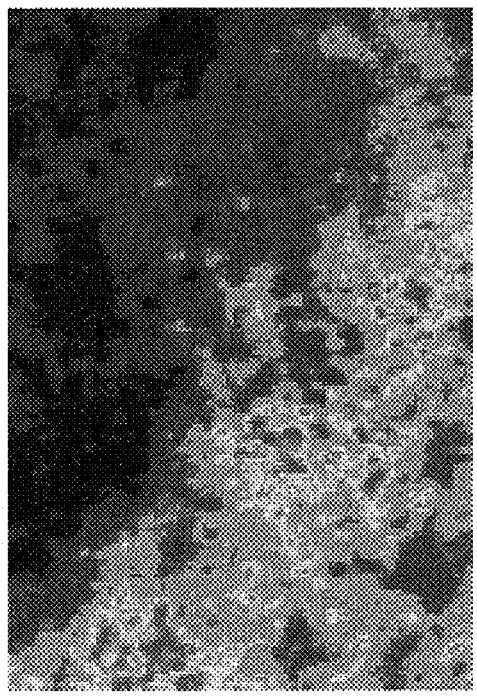
Figure 14D:
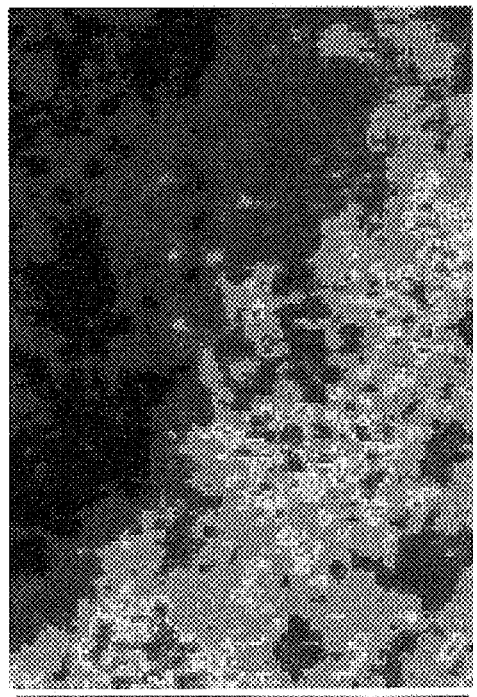

The value of the signal in each grid cell of a figure such as FIG. 12a will have an uncertainty as a result of the probabilistic nature of the method of the present invention. An advantage of the method is that an empirical distribution of that uncertainty can be determined at each such grid cell. FIG. 13 illustrates this advantage for three arbitrary locations (reference numbers 1301, 1302, and 1303) in FIG. 12a, which is reproduced for convenience in FIG. 13a. Specifically, graphs of the empirical distributions of uncertainty for these three arbitrary locations are depicted in FIG. 13b (location 1301), FIG. 13c (location 1302) and FIG. 13d (location 1303). Because a common use of seismic attributes, such as represented by this data set, is to calibrate a seismic signal to predict a rock property, such as porosity, this advantage allows the knowledge of the uncertainty underlying the seismic attribute to improve the estimate of the uncertainty in the rock property being predicted.

As noted above, an added capability of the present method is that random realizations can be generated. Each such realization will differ slightly from each other because of uncertainty in the value of the signal in each grid cell. Therefore, the realizations represent alternative explanations of the noisy observations.

FIGS. 14a–14d illustrate use of the method of the invention for generating random realizations of a seismic data set. Each of the four realizations has the Markov chain properties observed in the data and each is consistent with the observed value of the seismic attribute at every location, and consistent with the uncertainty measured by the method of this invention. More specifically, each has a substantial visual, in other words qualitative, similarity to the original data set after noise removal, with allowance for the uncertainties in the data, as well as the quantitative similarity that is inherent to the present method. Close examination of these four realizations reveals variations in the intensity and spatial distribution of the reds and yellows, which are thought to indicate potential hydrocarbon reservoir. Therefore, these realizations can be considered alternative interpretations of the observed data set. Such realizations may be used, for example, to evaluate different exploration and development alternatives in the face of the calculation or measurement uncertainty, or to calculate different possible reserve volumes. These analyses, in turn, help determine the range of possible financial outcomes consistent with the data.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

We claim:

1. A method of analyzing spatially-varying noise in seismic data comprising:
    representing transitions between data values at adjacent data locations in a seismic data set by Markov chains;
    constructing transition probability matrices from the Markov chains;
    predicting data values using the transition probability matrices; and
    determining noise values using the predicted data values.

2. The method of claim 1 wherein the determining of the noise values comprises subtracting predicted data values for data locations from the data values for the data locations.

3. The method of claim 1 further comprising calculating uncertainty values using the predicted data values.

4. The method of claim 3 wherein the uncertainty values are determined from the transition probabilities for transitions from adjacent locations.

5. The method of claim 3 further comprising using the transition probability matrices to generate a plurality of alternative data values at data locations in the seismic data.

6. The method of claim 1 wherein the transition probability matrices are calculated using tally matrices.

7. The method of claim 1 wherein the transition probability matrices are one-dimensional.

8. The method of claim 1 wherein the transition probability matrices are multi-dimensional.

9. The method of claim 8 wherein at least one dimension is a time dimension.

10. The method of claim 1 wherein the seismic data comprise seismic attribute data.

11. The method of claim 1 wherein the seismic data comprise seismic amplitude data.

12. The method of claim 1 wherein the seismic data have been flattened in the horizontal spatial dimension.

13. The method of claim 1 wherein the seismic data are subdivided into regions of regularity and each region is separately analyzed.

14. A method of analyzing spatially-varying noise in geologic data comprising:

estimating transition probability matrices using the geologic data;

predicting data values using the transition probability matrices; and determining noise values using the predicted data values.

15. A method of analyzing spatially-varying noise in seismic data comprising:

constructing transition probability matrices from the data in a seismic dataset;

predicting data values using the transition probability matrices; and determining noise values using the predicted data values.

* * * * *